United States Patent [19]

Myojo

[11] Patent Number: 4,649,661
[45] Date of Patent: Mar. 17, 1987

[54] FISHING ROD
[75] Inventor: Seiji Myojo, Sakai, Japan
[73] Assignee: Shimano Industrial Company Limited, Osaka, Japan
[21] Appl. No.: 823,057
[22] Filed: Jan. 27, 1986
[30] Foreign Application Priority Data Feb. 6, 1985 [JP] Japan .............................. 60-16159[U]

[51] Int. Cl.⁴ .............................................. A01K 87/00
[52] U.S. Cl. ......................................... 43/18.1; 43/22; 43/23
[58] Field of Search ............................ 43/18.1, 22, 23
[56] References Cited

U.S. PATENT DOCUMENTS 3,451,156  6/1969  Barnes ..................................... 43/23
3,618,253 11/1971  Edwards .................................. 43/22
4,516,351  5/1985  Highby ................................. 43/18.1
4,578,890  4/1986  Childre ................................... 43/22

Primary Examiner—Gene P. Crosby
Attorney, Agent, or Firm—Stevens, Davis, Miller & Mosher

[57] ABSTRACT

The rod includes a rod body tapered toward its tip and a handle coupled with the root of the rod body. A cylindrical relay member tapered at an angle greater than that of the rod body is fitted onto a coupling portion at the outer periphery of one end of the handle. The relay member includes at one end thereof a transmission portion for receiving the motion of a hooked fish through the rod body. As a result, an angler can sense the motion of a hooked fish through the cylindrical relay member by his hand gripping the handle.

4 Claims, 4 Drawing Figures

FISHING ROD

FIELD OF THE INVENTION

The present invention relates to a fishing rod, and more particularly to a fishing rod comprising a tapered rod body which is coupled at the root thereof to a handle having a reel mounting portion and a grip.

BACKGROUND OF THE INVENTION

Generally, the above kind of fishing rod includes a hollow rod body formed of prepreg of high strength fibre impregnated with synthetic resin and a handle formed mainly of synthetic resin into a block having a relatively large thickness. The handle includes a central insertion bore extending lengthwise of the handle, so that the rod body is fixedly fitted at the root thereof into the insertion bore.

Such fishing rod carries at a reel mounting portion thereof a fishing reel through engagement with its mounting leg, so that an angler grasps a handle grip to draw out a fishing line from a spool at the reel for casting, or operates the reel handle upon sensing a bite of a fish after casting to wind the line onto the spool, thus trying to draw near the hooked fish.

When a fish attracted by a bait or a lure is hooked, its motion is transmitted from the line to the fishing rod body.

Accordingly, the angler, when directly gripping the rod body, can sensitively detect the motion of the fish, but when gripping the handle coupled with the rod body, cannot do so because the handle is formed mainly of synthetic resin and is larger in thickness due to strength considerations, so as to absorb the motion of the fish.

Hence, a problem exists in that the angler delays the timing to draw up the hooked fish, thus resulting in a poor catch.

SUMMARY OF THE INVENTION

An object of the invention is to eliminate the problem wherein the angler, when using a conventional fishing rod, cannot sensitively detect the motion of a hooked fish. The present invention is characterized in that a cylindrical relay member separate from the fishing rod body and handle is formed to transmit the motion of the hooked fish from the rod body to the angler's hand gripping the handle.

In detail, the fishing rod of the invention includes a rod body having a tip portion and a root portion tapered toward the tip portion; a handle provided with a coupling portion having at the inside an elongate insertion bore along the rod body and at the outside an outer peripheral surface having a diameter larger than an outer diameter of the rod body and with a reel mounting portion having a stationary holder and a movable pusher; and a cylindrical relay member provided with a fitting portion to be fitted onto the outer periphery of the coupling portion at the handle, a transmission portion extending from the fitting portion toward the tip of the rod body at a taper angle larger than that of the rod body and being disposed opposite at its side extending away from the fitting portion toward the rod body tip to the outer periphery of the rod body, and an extension extending from the fitting portion toward a grip at the handle. The cylindrical relay member is fixed at the fitting portion thereof to the coupling portion at the handle.

In the aforesaid construction, the motion of a hooked fish is transmitted from the fishing line to the cylindrical relay member through the fishing rod, thereby being sensitively detected through the cylindrical relay member by the angler's hand gripping the handle.

The cylindrical relay member, which is tapered at an angle larger than that of the rod body and fixed to the handle through the fitting portion, contacts or fixes the transmission portion with or to the rod body. As a result, the bending stress acting on the rod body is distributed onto the cylindrical relay member, thereby reliably preventing the coupling portion of the handle and the rod body from being subjected to a concentrated stress and also preventing the rod body from breaking due to concentrated stress.

The above and further objects and novel features of the invention will be more fully apparent from the following detailed description when read in connection with the accompanying drawings.

DETAILED DESCRIPTION OF THE INVENTION

Figure 1:
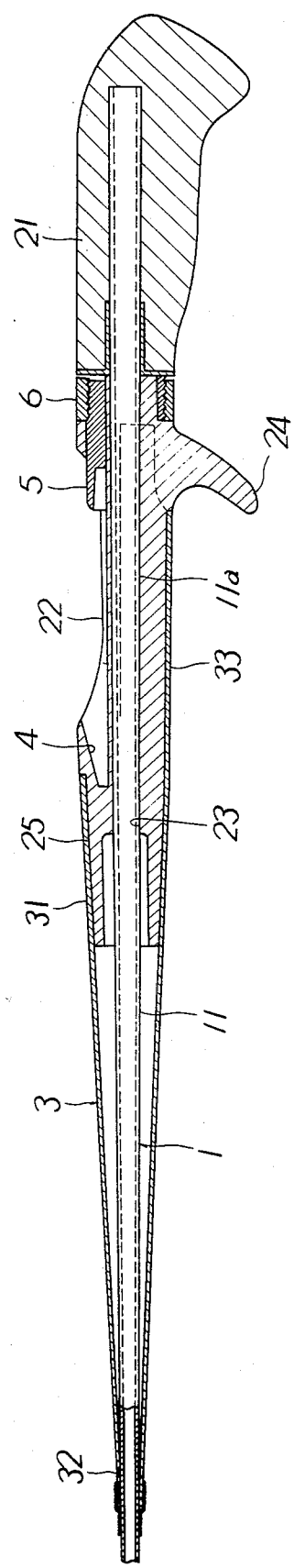
FIG. 1 is a partial sectional view of an embodiment of a fishing rod of the present invention.

A fishing rod as shown in the drawings comprises a rod body 1 which is formed of prepreg of a paralleled sheet or a woven sheet of high strength fibre, such as glass fibre or carbon fibre, impregnated with synthetic resin and which is tapered toward the tip of the rod body 1, and a handle 2 having a grip 21 at the root and a reel mounting portion 22 positioned before the grip 21 and formed of synthetic resin or synthetic resin including glass. Handle 2 is provided at its center with an insertion bore 23 extending axially from the utmost end at the reel mounting portion 22 toward the grip 21, so that the root 11 of the rod body 1 is fitted into the insertion bore 23 to thereby fix the rod body 1 to the handle 2, perferably by use of an adhesive.

Also the rod body 1 is produced in such a manner that the prepreg is wound onto a core bar and heated under pressure so as to be made hollow.

The grip 21 and reel mounting portion 22, as shown, are separate from each other and coupled by an adhesive or the like, but they may alternatively be integral with each other. The reel mounting portion 22 at the handle 2 is provided at the base with a finger hook 24 projecting radially outwardly from the base.

Figure 2:
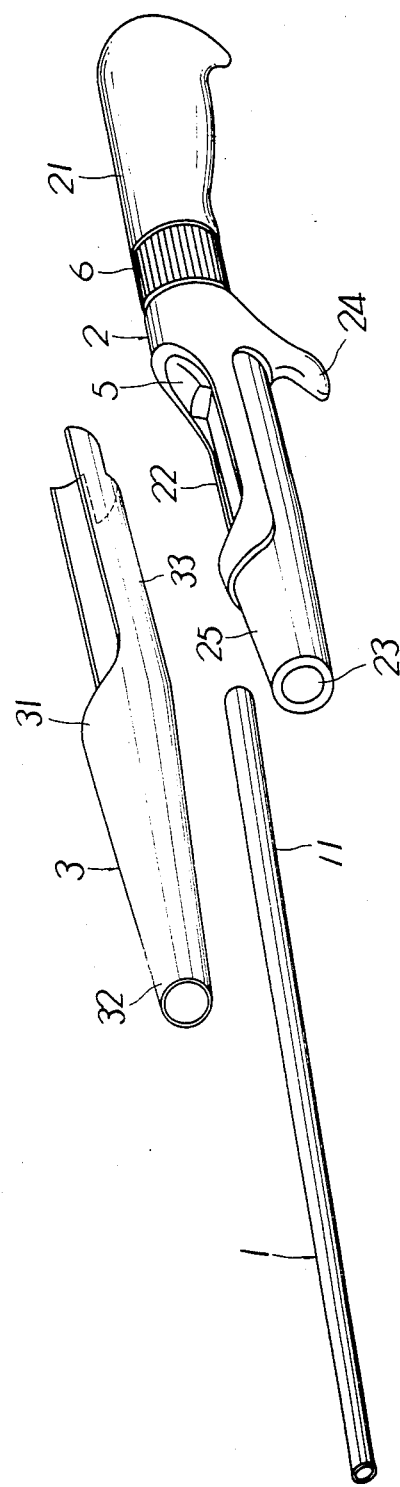
FIG. 2 is a perspective exploded view of the FIG. 1 embodiment.

In the embodiment shown in FIGS. 1 and 2, at the utmost end of the handle 2 are provided a coupling portion 25 having an outer periphery with a diameter larger than an outer diameter of the root 11 at the rod body 1 and a cylindrical relay member 3 fixedly fitted onto the coupling portion 25. The cylindrical relay member 3 is provided with a fitting portion 31 to be fitted onto the coupling portion 25 and with a transmission portion 32 tapered toward the tip of the rod body 1 at a taper angle larger than that of the rod body 1 and opposite to the outer periphery thereof. Fitting portion 31 is fixed onto the coupling portion 25 and the transmission portion 32 is fixed to an intermediate portion of the rod body 1 by fixing means, such as adhesives, respectively.

The cylindrical relay remember 3 is formed of prepreg of a paralleled sheet or a woven sheet of carbon fibre or glass fibre impregnated with synthetic resin, the prepreg being wound onto a core bar and heated under pressure to be hollow.

The fitting portion 31 and transmission portion 32 have inner surfaces of a size to mate with the outer peripheries of the coupling portion 25 and the intermediate portion of the rod body 1, and are fixed thereto by use of adhesives respectively, but the transmission portion 32 need not necessarily be fixed. Also, thread or tape-like prepreg is wound across the outer peripheries of the fitting portion 31 and coupling portion 25 and across the outer peripheries of the transmission portion 32 and rod body 1, thereby more tightly fixing these members with each other.

In addition, the cylindrical relay member 3 may be formed of synthetic resin or metal other than the prepreg, thus relay member 3 not limited with respect to the material of which it is formed.

The reel mounting portion 22 at the handle 2 is provided with a stationary holder 4 for holding a mounting leg (not shown) of the reel to be fitted into the reel mounting portion 22, a movable pusher 5 for urging the mounting leg toward the stationary holder 4, and an operating ring 6, so that the operating ring 6 is rotated to actuate the pusher 5.

The fishing rod constructed as described above allows the fishing reel to be mounted on the reel mounting portion 22 at the handle 2, so that the angler grips the grip 21 at the handle 2 by his hand and puts, for example, his forefinger of this hand on the finger hook 24, or grips the reel mounting portion 22 together with the reel. Bending stress acting on the rod body 1 is distributed onto the cylindrical relay member 3, thereby preventing the root 11 of the rod body 1 from being subjected to a concentrated stress.

Also, the motion of the hooked fish is transmitted to the rod body 1 from the fishing line and causes particular vibrations transmitted from the rod body 1 directly to the cylindrical relay member 3.

The angler, when fishing, can touch the cylindrical relay member 3 by the fingers of his hand gripping the grip 21, thereby sensitively detecting a bite of a fish through his hand gripping the handle 2.

Furthermore, in the aforesaid embodiment, the cylindrical relay member 3 is provided with an extension 33 semicircular in section and extending from the fitting portion 31 toward the finger hook 24. Extension 33 is coupled with the rear of the reel mounting portion 22, so that the angler's finger placed on the finger hook 24 is brought into contact with the utmost end portion of the extension 33. Thus, the angler can sensitively detect the motion of a hooked fish when he grips the grip 21 with his hands and places a finger thereof on the finger hook 24.

The root 11 of the rod body 1 is, as shown in FIG. 1, fitted into the coupling portion 25 and grip 21 at the handle 2 so that the handle 2 is reinforced by the rod body 1. Alternatively, the rod body 1 may be fitted at the root 11 into only an intermediate portion of the coupling 25. The root 11 of the rod body 1, however, is fitted into the handle 2 throughout a substantially entire length thereof so as to be reinforced, whereby the handle 2 can be made smaller in thickness. Also, for example, at the rear surface of the reel mounting portion 22 is provided a finger hole facing a fitted portion 11a at the root 11 of the rod body 1, so that the finger of the angler's hand gripping the handle 2 can come into contact directly with the fitted portion 11a.

Also, the transmission portion 32 at the cylindrical relay member 3 has an inner diameter mating with an outer diameter of the intermediate portion of the rod body 1, thereby being brought into close contact with the entire outer periphery of the intermediate portion of the rod body 1 and fixed thereto. Alternatively, the transmission portion 32 need only contact the intermediate portion of the rod body 1, or have an inner diameter larger than an outer diameter at the intermediate portion of the rod body 1, thereby coming into contact only in part therewith.

Figure 3:
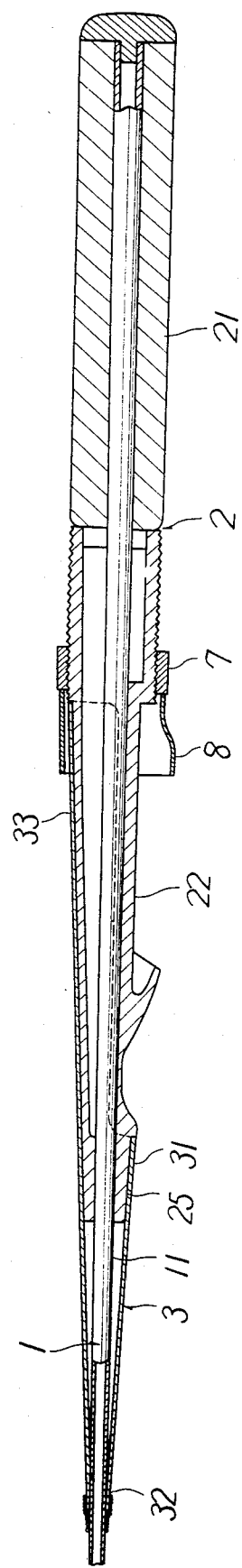
FIG. 3 is a partial sectional view of a modified embodiment of a fishing rod of the invention.
Figure 4:
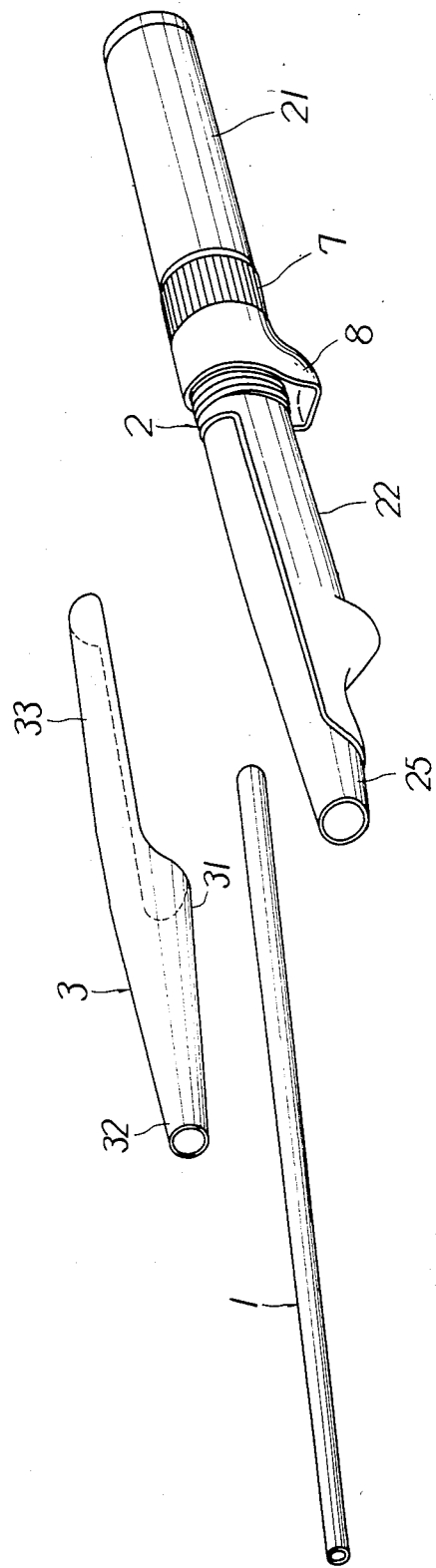
FIG. 4 is a perspective exploded view of the FIG. 3 embodiment.

Alternatively, the fishing rod of the invention may, as shown in FIGS. 3 and 4, be provided at the handle 2 with an operating ring 7 rotatable and axially movable and a movable pusher 8 only axially movable through the rotation of the operating ring 7.

As seen from the above, the fishing rod of the invention is provided with the cylindrical relay member 3 having the fitting portion 31 and transmission portion 32. Fitting portion 31 is fixed to the handle 2 as described above and functions to distribute onto the cylindrical relay member 3 the stress acting on the rod body 1, thereby reliably preventing the coupling portion 25 of the rod body 1 and handle 2 from being subjected to a concentrated stress and also preventing rod body 1 from breaking due to said stress.

Furthermore, since the cylindrical relay member 3 is fixed to the handle 2, the angler can touch the cylindrical relay member 3 in a natural fashion by the finger of his hand gripping the handle 2 so as to sensitively detect through his hand the motion of a hooked fish transmitted from the rod body 1 to the cylindrical relay member 3, thereby providing a remarkably good detection of a hooked fish.

Although several embodiments have been described, they are merely exemplary of the invention and not to be construed as limiting, the invention being defined solely by the appended claims.

What is claimed is:

1. A fishing rod, comprising:
   a rod body having an utmost end portion and a root portion, said rod body being tapered from said root portion to said upmost end portion,
   a handle comprising (i) a coupling portion having an inner elongate insertion bore receiving said rod body and an outer peripheral surface having a diameter larger than an outer diameter of said rod body, and (ii) a reel mounting portion having a stationary holder for engaging with a reel mounting leg and a movable pusher for pushing said reel mounting leg into engagement with said pusher, and
   a cylindrical relay member comprising (i) a fitting portion fitted onto said outer peripheral surface of said coupling portion of said handle, (ii) a transmission portion extending from said fitting portion toward the utmost end portion of said rod body at a taper angle larger than a taper angle of said rod body, an utmost end portion of said transmission portion being disposed opposite to an outer periphery of a portion of said rod body, and (iii) an extension portion extending from said fitting portion toward a grip of said handle, said cylindrical relay member being fixed at said fitting portion to said coupling portion of said handle.

2. A fishing rod as set forth in claim 1, wherein said transmission portion of said cylindrical relay member is fixed to an outer peripheral surface of an intermediate portion of said rod body.

3. A fishing rod as set forth in claim 1, wherein an inner surface of said transmission portion of said cylindrical relay member is in movable contact with an outer peripheral surface of an intermediate portion of said rod body.

4. A fishing rod as set forth in claim 1, wherein said insertion bore of said handle extends to said grip, so that the root portion of said rod body is inserted into said grip through said insertion bore.

* * * * *